United States Patent [19]

Yanagida et al.

[11] Patent Number: 5,159,584
[45] Date of Patent: Oct. 27, 1992

[54] BIAS-MAGNETIC FIELD GENERATING SYSTEM OF PHOTO-MAGNETIC RECORDING DEVICE

[75] Inventors: Tsuneo Yanagida; Kazuyasu Motoyama, both of Hachiohji, Japan

[73] Assignee: Olympus Optical Company Limited, Tokyo, Japan

[21] Appl. No.: 762,788

[22] Filed: Sep. 19, 1991

Related U.S. Application Data

[63] Continuation of Ser. No. 394,210, Aug. 15, 1989, abandoned.

[51] Int. Cl.$^5$ .................... G11B 11/10; G11B 13/04
[52] U.S. Cl. ......................... 369/13; 360/59; 360/114
[58] Field of Search ............ 369/13; 360/114, 59; 365/122

[56] References Cited

U.S. PATENT DOCUMENTS

| | | | |
|---|---|---|---|
| 4,610,009 | 9/1986 | Connell | 369/13 X |
| 4,612,587 | 9/1986 | Kaneko et al. | 369/13 X |
| 4,748,606 | 5/1988 | Naito et al. | 360/59 X |
| 4,750,159 | 7/1988 | Yoda | 360/59 X |
| 4,862,437 | 8/1989 | Okada | 369/13 |

FOREIGN PATENT DOCUMENTS 60-175201 9/1985 Japan ..................... 360/114
237241 3/1987 Japan ..................... 360/114

*Primary Examiner*—Stuart S. Levy
*Assistant Examiner*—Joseph A. Rhoa
*Attorney, Agent, or Firm*—Emmanuel J. Lobato; Robert E. Burns

[57] ABSTRACT

A photo-magnetic (magneto-optic) recording device having recording medium in the form of a rotating magnetic disc having magnetic characteristics in a direction perpendicular to its surface has a pickup head (7) disposed on one side of the disc and movable radially of the disc to scan selected areas of the disc. On the side of the disc opposite to that on which the pickup head is located, there are provided a plurality of coils (8) generating a bias-magnetic field applied to the disc. The coils are disposed in overlapping arrangement with their centers disposed on a line extending radially of the disc. The coils are energized by electric circuitry which comprises means for sensing the position of the pickup head and energizing a respective coil located in position to apply a bias-magnetic to the area of the disc scanned by the pickup head.

3 Claims, 4 Drawing Sheets

BIAS-MAGNETIC FIELD GENERATING SYSTEM OF PHOTO-MAGNETIC RECORDING DEVICE

This is a continuation of application Ser. No. 07/394,210, filed Aug. 15, 1989, now abandoned.

FIELD OF INVENTION

The present invention relates to photo-magnetic recording apparatus of the type in which a magnetic recording medium for example a magnetic disc is magnetized in a direction perpendicular to its surface. In particular the invention is directed to a system for generating a bias-magnetic field which is applied to the recording medium in an area where recording or erasing is to be effected.

SUMMARY OF THE INVENTION

In photo-magnetic (magneto-optical) recording apparatus a pickup head is disposed on one side of a magnetic recording medium which has magnetic characteristics in a direction perpendicular to its surface and is movable relative to the recording medium so as to scan a selected portion of the recording medium. On the opposite side of the recording medium there is provided means for generating a bias-magnetic field which is applied to the recording medium.

In accordance with the invention, the bias-magnetic field generating means comprises a plurality of small coils each of which, when energized, generates an individual bias-magnetic field. The coils are arranged in mutually overlaping relation to one another so that magnetic fields generated by the coils overlap one another.

Means is provided for coordinating the selective energizing of the coils with the movement of the pickup head relative to the recording medium so as to provide an effective bias-magnetic field in an area of the recording medium scanned by the pickup means.

BRIEF DESCRIPTION OF THE DRAWINGS

The invention will be more fully understood from the following description of a preferred embodiment shown by way of example in the accompanying drawings in which.

DESCRIPTION OF PREFERRED EMBODIMENT

Figure 1:
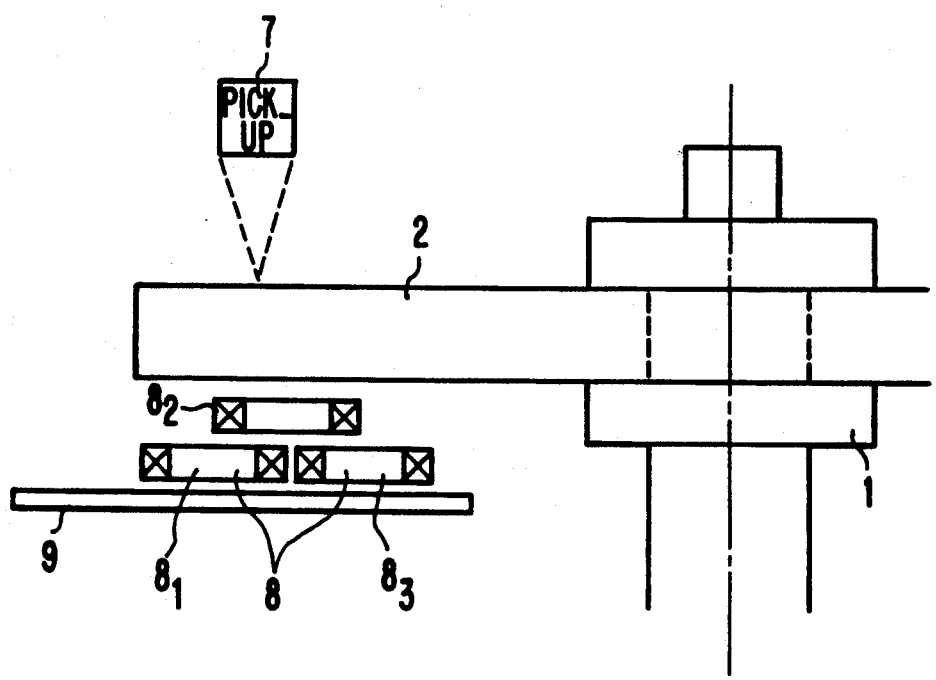
FIG. 1 is a schematic illustration of a bias-magnetic-field generating system in accordance with the invention comprising a plurality of overlapping coils.

As illustrated schematically in FIG. 1, a photomagnetic recording apparatus comprises a magnetic disc 2 placed on a turntable 1. The disc 2 is made of, for example, MnBi, TbFe, or DyFe. A pickup 7 irradiates a light beam which is focused on a surface of the disc 2 as a spot. In order to record or erase data at that spot, a bias-magnetic-field should be generated at that place with the perpendicular direction to the surface of the disc 2. For this purpose there is provided an assembly of small coils shown as comprising coils $8_1$, $8_2$ and $8_3$ on the opposite side of the disc 2 to the pickup 7. The small coils $8_1$, $8_2$ and $8_3$ are spaced from the disc 2 and are mounted on a base 9 in overlapping relation to one another with the axis of the coil perpendicular to the disc 2.

The pickup 7 is movable radially of the disc 2 in order to scan selected areas of the disc. Movement of the pickup is controlled and position information is generated in known manner by an address system as disclosed by way of example in U.S. Pat. Nos. 4,106,058, 4,142,209, 4,375,091 and 4,506,355.

Figure 2:
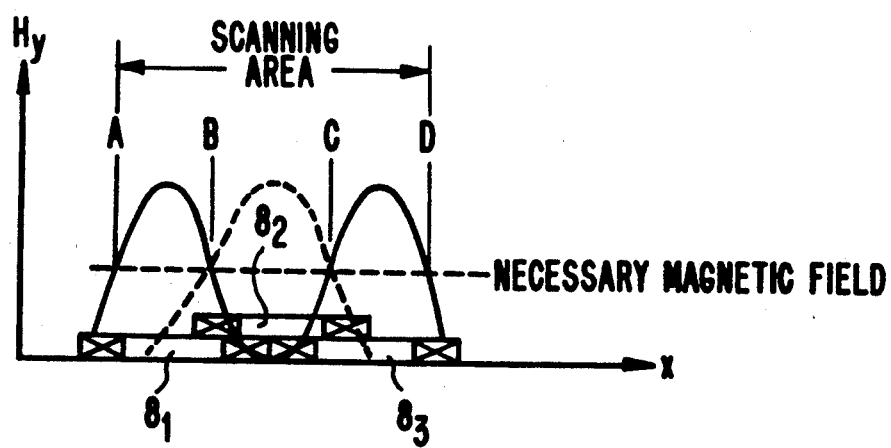
FIG. 2 is a schematic illustration of magnetic fields generated by the coils.

In order to provide an effective bias-magnetic-field in the area where the pickup 7 is located, one or another of the coils $8_1$, $8_2$ and $8_3$ is energized according to an address signal or a location signal from the pickup 7 corresponding to the location of the pickup. In FIG. 2 the magnetic fields generated by the respective coils are schematically illustrated. In FIG. 2 the horizontal axis represents radial distance from the center of the disc while the vertical axis represents strength of the magnetic field. The strength of the magnetic field necessary to effect recording or erasing on the disc is indicated by a horizontal broken line.

If the pickup 7 is located between positions A and B, coil $8_1$ is energized. If the pickup is located between positions B and C coil $8_2$ is energized. If the pickup is located between positions C and D coil $8_3$ is energized. To the selected coil, electric current is applied and a predetermined perpendicular bias-magnetic-field is generated with desired polarity according to whether the operation is recording or erasing.

Figure 3:
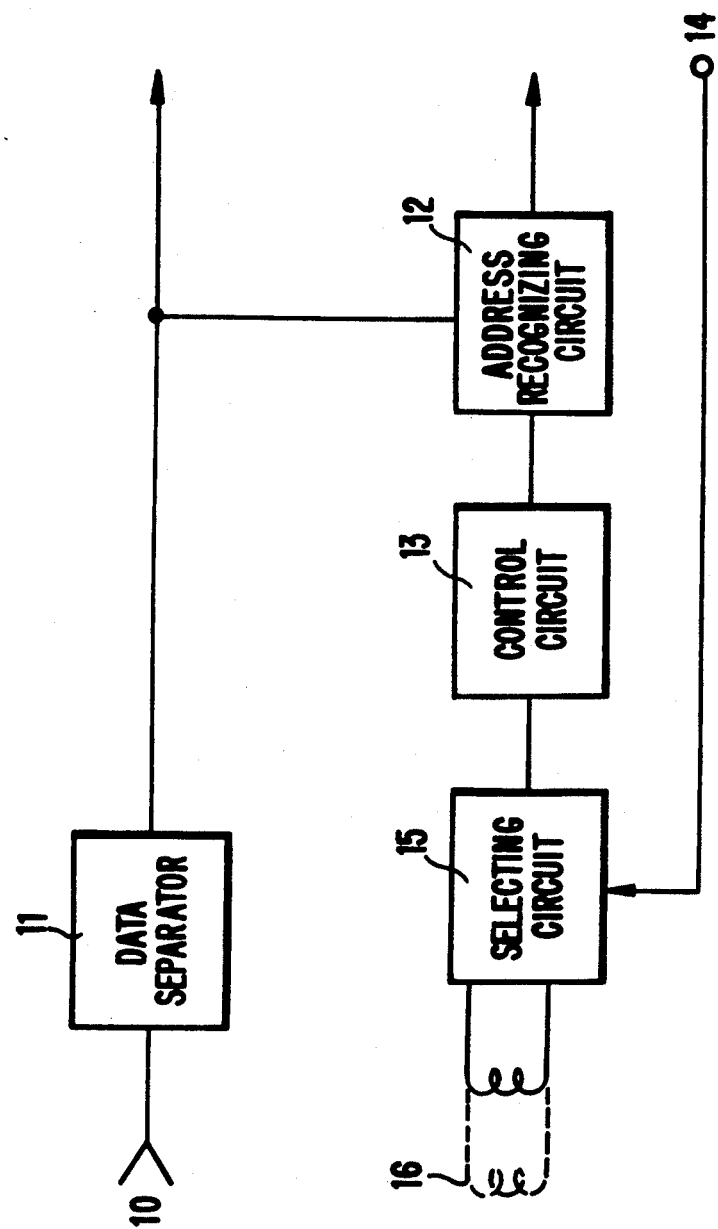
FIG. 3 is a block diagram to explain the operation of the bias-magnetic field generating system illustrated in FIG. 1.

A block diagram to explain the operation of the device is shown in FIG. 3 in which reference numeral 10 represents an input of a reading signal, block 11 is a data separator which separates the reading signal into a data signal and a clock signal, block 12 is an address recognizing circuit which obtains an address signal from the data signal, block 13 is a control circuit which converts the address signal to a coil selecting signal, 14 represents a polarity selecting input to which a polarity selecting signal is inputted according to whether a recording or an erasing operation is being carried out, block 15 is a bias-magnetic-field sequential selecting circuit which selects coils in accordance with the polarity selecting signal and the coil selecting signal and 16 indicates coils.

Figure 4:
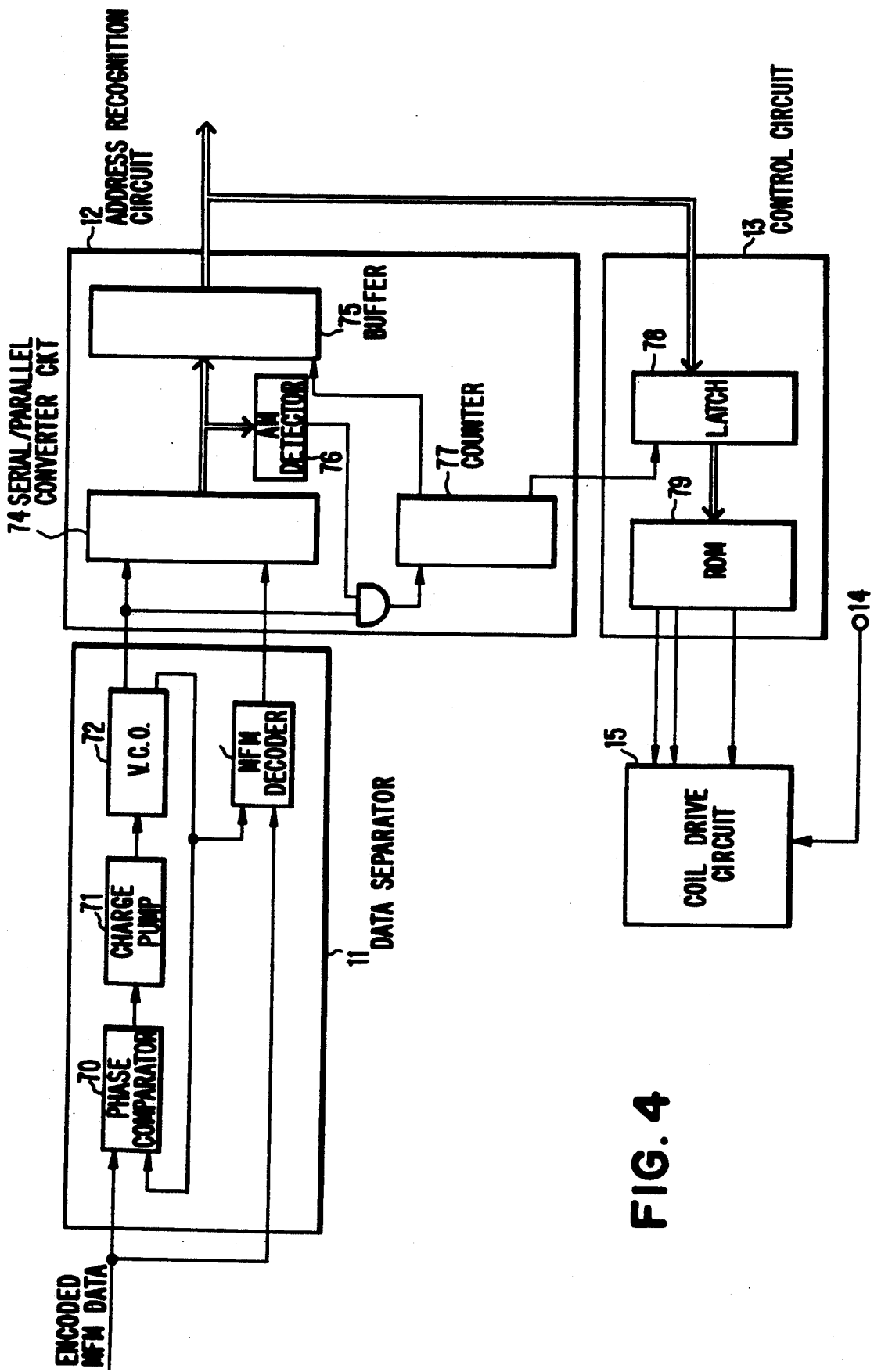
FIG. 4 is a block diagram of a portion of the circuit shown in FIG. 3.

The circuitry of the data separator 11, the address recognizing circuit 12 and the control circuit 13 is shown in FIG. 4. The data separator II comprises a phase comparator 70 having first and second inputs, a charge pump 71 connected to an output of the phase comparator and a VCO22 connected to an output of the charge pump and having first and second outputs. The second output of the VCO is fed back to the input of the phase comparator. The data separator 11 further comprises an MFM decoder 73 having first and second inputs for decoding MFM signals from the incoming encoded MFM data. The first input of the MFM decoder is connected to the output of the VCO. Encoded MFM data are supplied to the first input of the phase comparator and the second input of the MFM decoder. The VCO supplies VCO clock signals at the first output thereof and the MFM decoder supplies NRZ data at the output thereof. The address recognition circuit 12 comprises a serial/parallel converter circuit 74, a buffer 75 connected to the converter 74 through a bus connection, and AM (Address Mark) detection circuit 76 connected to the converter 74 and buffer 75 through a bus connection and a counter 77 connected to the AM detector 76 through an AND gate and having a first output connected to the buffer 75 and a second output. The VCO clock signals and the NRZ data signals derived from the data separator 11 are supplied to the serial/parallel converter circuit 74 converted into 8 bit parallel data therein and supplied to the buffer 75. Since the drive (energizing) of the coil is performed by switching or selection with the track number, the track number portion (two bites) must be derived from the ID portion and be supplied to the control circuit 13 of the bias coil drive 15. This is performed by the AM detection circuit 76 and the counter 77. The control circuit 13 of the coil drive or selection circuit 15 comprises a latch 78 connected to the CPU through a bus connection and connected to the counter 77, and a ROM 79 connected to the latch through a bus connection. Since the track number portion is placed after the AM portion with predetermined clocks, the track number can be obtained by counting predetermined clock pulses in the counter 27 after AM detection. The output of the counter drives the latch 28, thereby latching the data in the buffer 25. The ROM 29 generates the data which perform selection of coils by the latched track number. In the ROM 29, the data for selecting coils in accordance with the track number are previously written, so that coil selection or drive signals can be generated by supplying address signals to the ROM.

Figure 5:
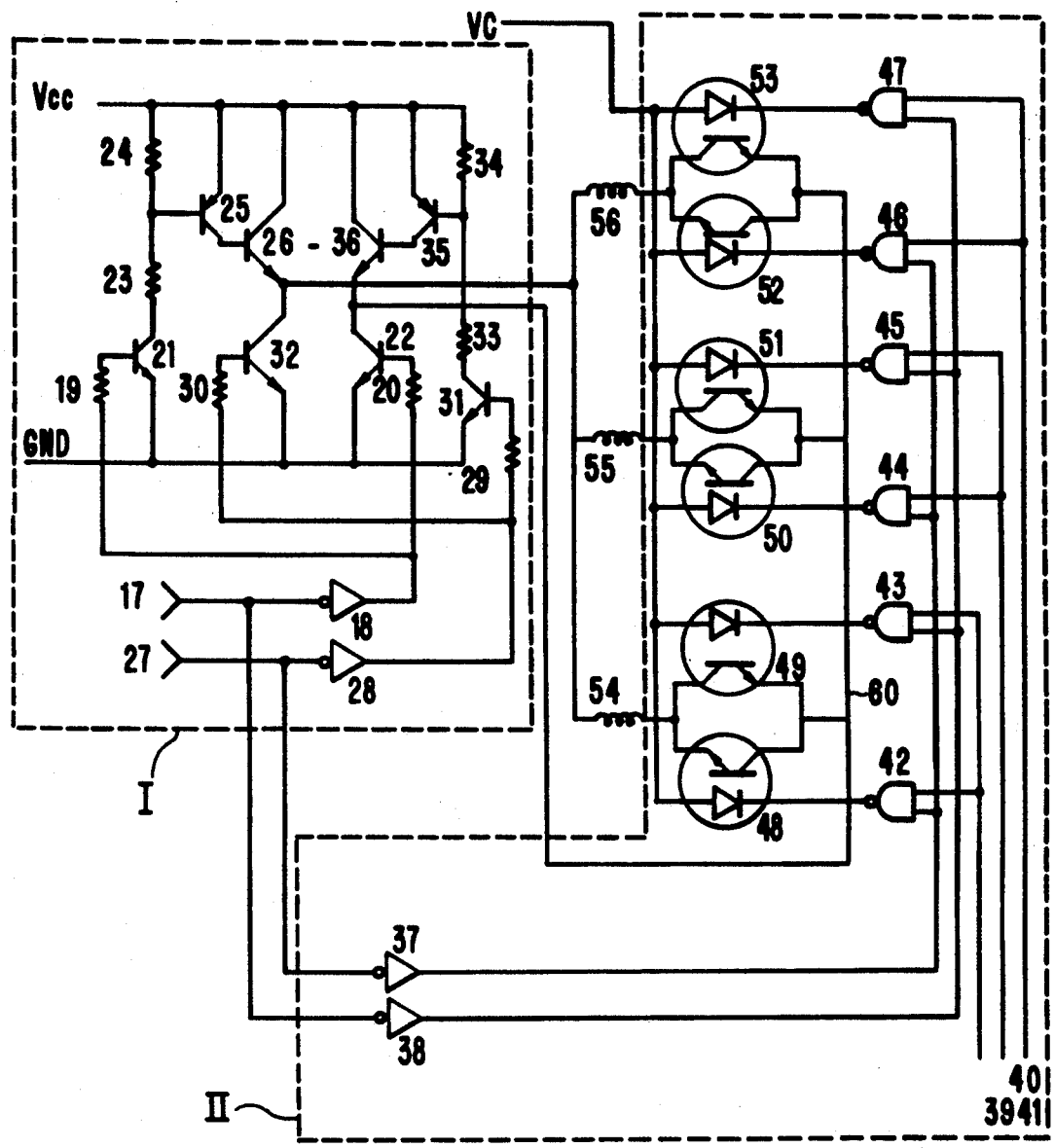
FIG. 5 is a block diagram of a further portion of the circuit shown in FIG. 3

The bias-magnetic-sequential selecting circuit 15 as shown in FIG. 5 comprises a polarity selecting part I which selects the polarity of coil current according to whether a recording operating or an erasing operation is to be carried out and a coil selecting part II which selects a certain coil and gives it energizing current.

In the polarity selecting part I, the first polarity selecting input 17 is connected to bases of transistors 21 and 22 through an inverter 18 and base resistors 19 and 20. A collector of the transistor 21 is connected to a source $V_{cc}$ through base bias resistors 23 and 24 of a transistor 25. A transistor 26 is coupled with a transistor 25 with a Darlington conjunction. The second polarity selecting input 27 is connected to bases of transistors 31 and 32 through an invertor 28 and base resistors 29 and 30. A collector of the transistor 31 is connected to the source $V_{cc}$ through bias resistors 33 and 34 of a transistor 35. A transistor 36 is coupled to the transistor 35 with Darlington conjunction.

The coil selecting part II consists of inverters 37 and 38 which are connected to the polarity selecting inputs 17 and 27 respectively; NAND gates 42–47 which receive outputs of the inverters 37 and 38, and coil selecting signals from coil selecting inputs 39, 40, 41; photocouplers 38–53 which are connected to the NAND gates 42–47 respectively. The photocouplers are connected to a common line 60 in the right side which is connected to an emitter of the transistor 36 and a collector of the transistor 22 in the polarity selecting part I.

Small coils 54–56, which generate bias-magnetic-field according to the invention, have a common connecting point at one end of the coiled wire. The common connecting point is connected to an emitter of the transistor 26 and a collector of the transistor 32 in the polarity selecting part I. The other wire end of each coil is connected to the photo-coupler 48 and 49, or 50 and 51, or 52 and 53, separately.

FIG. 7 shows a general structure of one of the coils of the bias-magnetic-field generating system according to the invention. Assuming that a recording or erasing area on a disc is rectangular and that the length of the long sides of the rectangle is 2a and that of the short sides is 2b, the following equation is obtained $$H = \frac{Iab}{\pi \sqrt{a^2 + b^2 = x^2}} \left( \frac{1}{a^2 + x^2} + \frac{1}{b^2 + x^2} \right)$$

Figure 6:
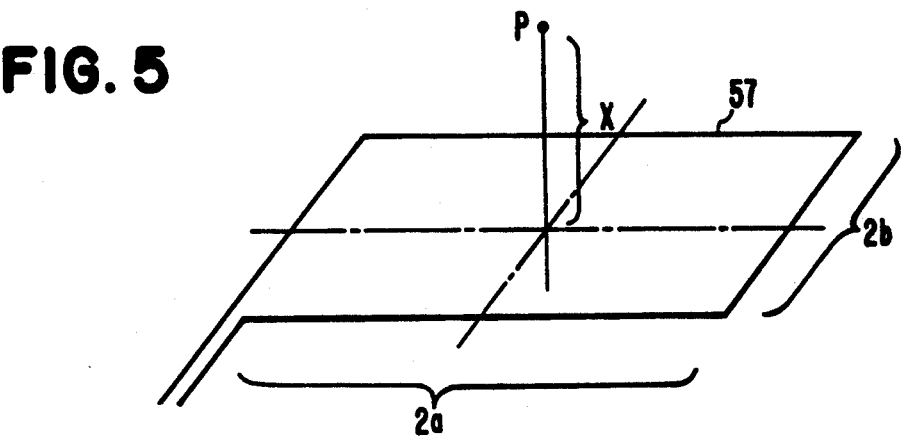
FIG. 6 illustrates a coil structure applied to the bias-magnetic-field generating system of the present invention.

In the equation, H is a perpendicular component of a magnetic field at the point P, which is located in a disc with a distance x from the center of the coil as shown in FIG. 6, and I is electric current flowing in the coil 57. When a recording area on a disc has a width of 40 mm in the radial direction of the disc the preferred values are 40 mm for 2a, 5 mm for 2 b and 5 mm for x as far as generating a magnetic field with one rectangular coil. In that case the perpendicular component H of a magnetic field at the point P is 26.3 A/m, assuming that the magnetizing current equals 1A and the turn number of the coil equals 1.

We will now explain the operation of the bias-magnetic-field generating system according to this invention, the structure of which has been described above. In this system, an address signal is taken out from a reading signal which is an output of the pickup 7. Then the address signal is converted to a coil selecting signal by the control circuit 13 which selects a coil corresponding to the location of the pickup 7. The bias-magnetic-field sequential selecting circuit 15 selects a coil $8_1$, $8_2$, or $8_3$, according to the coil selecting signals and supplies electric current to the selected coil with a certain polarity according to the polarity selecting signal which selects a current polarity corresponding to a recording operation or an erasing operation. Consequently, the desired bias-magnetic-field is generated in the area scanned by the pickup 7 with a desired polarity. There are other methods of selecting a coil. For example, a coil can be selected according to a location signal from a position detector such as a line encoder which is linked to the pickup 7 instead of the address signal as described above.

When the first polarity selecting input 17 is made low level by the bias-magnetic-field sequential selecting circuit, the output of the inverter 18 becomes high level. That makes the transistor 21 ON so that the transistors 25 and 26 which supply electric current for the coils become ON state. While the transistor 22, which draws electric current from coils 54, 55 and 56 through the coil selecting part II, becomes ON state with the high level output of the inverter 18. In this state, as making a coil selecting input 39 high level, the output of the NAND gate 43 becomes low level because of the high level output of the inverter 38, and then the photo-coupler 49 becomes ON state. Consequently, a coil current flows from the source $V_{cc}$, through the transistor 26, the coil 54, the photo coupler 49, the draw-in transistor 22 and to ground.

In the same way, selecting the polarity selecting inputs 17, 27; and the coil selecting inputs 39, 40, 41; a desired magnetic field can be obtained in any one of the coils $8_1$, $8_2$ or $8_3$, with a desired polarity.

The number of coils is not restricted although three coils are used in the preferred embodiment of the invention described above. Additionally, a photocoupler can be replaced by other devices such as, for example, a combination of a light emitting diode and a photo transistor, or FET etc. Moreover, the recording medium is not restricted to a disc.

We claim:

1. Apparatus for photo-magnetic recording, reproducing and erasing data or information on a magnetic recording medium comprising, means for mounting a magnetic recording medium having an easy axis of magnetization in a direction perpendicular to the surface thereof, a pickup device disposed for scanning one side of the recording medium, means for effecting relative movement between the pickup device and the recording medium, field generating means for generating bias-magnetic fields selectively applied to the recording medium, said field generating means being disposed spaced from the recording medium on a side thereof opposite to the side scanned by the pickup device and comprising a plurality of only partially overlapping small coils each having an axis normal to the recording medium and energizeable for generating respective, individual bias-magnetic fields partially overlapping one another, data separator means receptive of reading signals form the pickup device for separating the reading signals into data signals and clock signals, address recognition circuit means receptive of the data signals and the clock signals for developing address signals representative of corresponding positions of the pickup device relative to the recording medium, control circuit means receptive of the address signals for converting them to coil selecting signals, coil selecting circuit means for selecting coils to be energized corresponding to the location of the pickup device, and said coil selecting circuit means comprising means for selectively energizing in a desired polarity the coils individually, sequentially to develop fields in contiguous respective areas each coordinated with a corresponding area of the recording medium being scanned by the pickup device, said data separator means comprising a phase comparator receptive of said reading signals, a charge pump coupled to the phase comparator for receiving outputs therefrom, a voltage controlled oscillator coupled to the charge pump to receive outputs therefrom and develop clock signals outputs applied to said address recognition circuit means, means for applying said clock signal outputs as an input to said phase comparator, a modified frequency modulation decoder receptive of said reading signals for decoding modified frequency modulation data therefrom and receptive of clock signals from said voltage controlled oscillator and supplying non return to zero data as an output applied to said address recognition circuit means.

2. Apparatus for photo-magnetic recording, reproducing and erasing data or information on a magnetic recording medium according to claim 1, in which said address recognition circuit means comprises a serial/parallel converter circuit receptive of the VCO signal outputs and said NRZ data supplied by said MFM decoder of said data separator means and converting it into 8 bit parallel data, a buffer coupled to said converter circuit to receive said 8 bit parallel data, and an address mark detection circuit and a counter coupled to said buffer and said detection circuit for supplying said address signals to said control circuit means.

3. Apparatus for photo-magnetic recording, reproducing and erasing data or information on a magnetic recording medium according to claim 2, in which said control circuit means comprises a latch connected to said buffer and said counter to receive address signals therefrom, a read only memory coupled to said latch generating data developing said coil selecting signals.

* * * * *